(12) United States Patent
Winzinger

(10) Patent No.: US 10,350,816 B2
(45) Date of Patent: Jul. 16, 2019

(54) FORM-FILING MACHINE

(71) Applicant: KRONES AG, Neutraubling (DE)

(72) Inventor: Frank Winzinger, Regensburg (DE)

(73) Assignee: KRONES AG, Neutraubling (DE)

(*) Notice: Subject to any disclaimer, the term of this patent is extended or adjusted under 35 U.S.C. 154(b) by 452 days.

(21) Appl. No.: 14/825,992

(22) Filed: Aug. 13, 2015

(65) Prior Publication Data

US 2016/0052189 A1    Feb. 25, 2016

(30) Foreign Application Priority Data

Aug. 20, 2014 (EP) .................................... 14181646

(51) Int. Cl.
| | | |
|---|---|---|
| *B65B 3/02* | (2006.01) | |
| *B67C 3/22* | (2006.01) | |
| *B29C 49/02* | (2006.01) | |
| *B29C 49/06* | (2006.01) | |
| *B29C 49/12* | (2006.01) | |

(Continued)

(52) U.S. Cl.
CPC .............. *B29C 49/46* (2013.01); *B29C 49/12* (2013.01); *B65B 3/022* (2013.01); *B65B 31/042* (2013.01); *B65B 31/044* (2013.01); *B65B 39/145* (2013.01); *B29C 49/06* (2013.01); *B29C 49/36* (2013.01); *B29C 49/4284* (2013.01); *B29C 2049/023* (2013.01); *B29C 2049/024* (2013.01); *B29C 2049/1228* (2013.01); *B29C 2049/4605* (2013.01); *B29C 2049/4626* (2013.01); *B29C 2049/4664* (2013.01); *B29C 2049/4679* (2013.01); *B29C 2049/4694* (2013.01); *B29C 2049/4697* (2013.01); *B29C 2049/5841* (2013.01); *B29K 2067/003* (2013.01); *B29K 2105/258* (2013.01); *B29L 2031/7158* (2013.01); *B65B 2210/06* (2013.01);

(Continued)

(58) Field of Classification Search
CPC .............. B29C 2049/023; B29C 49/08; B29C 2049/1228; B29C 2049/4605; B29C 2049/4679; B29C 2049/4694; B29C 49/06; B29C 49/12

See application file for complete search history.

(56) References Cited

U.S. PATENT DOCUMENTS

| | | | | |
|---|---|---|---|---|
| 5,730,914 | A | * | 3/1998 | Ruppman, Sr. ......... B29C 49/46 264/28 |
| 2010/0225030 | A1 | * | 9/2010 | Hirdina ................... B29C 49/12 264/524 |

(Continued)

FOREIGN PATENT DOCUMENTS

| | | |
|---|---|---|
| DE | 3226172 A1 | 1/1984 |
| WO | WO-2010/116849 A1 | 10/2010 |
| WO | WO-2014/019691 A2 | 2/2014 |

OTHER PUBLICATIONS

European Search Report for Application No. 14181646.2, dated Mar. 11, 2015.

*Primary Examiner* — Stella K Yi

(74) *Attorney, Agent, or Firm* — Marshall, Gerstein & Borun LLP

(57) ABSTRACT

Process to produce containers out of preforms, in which the preform is inserted in a form-filling station, molded and filled in this station. Gas, which remains in the head space after the end of the filling process, is replaced by a purge gas, and a form-filling machine is provided to produce and to fill containers made of preforms.

7 Claims, 6 Drawing Sheets

(51) Int. Cl.
*B29C 49/36* (2006.01)
*B29C 49/42* (2006.01)
*B29C 49/46* (2006.01)
*B29C 49/58* (2006.01)
*B29K 67/00* (2006.01)
*B29L 31/00* (2006.01)
*B65B 31/04* (2006.01)
*B65B 39/14* (2006.01)
*B29K 105/00* (2006.01)

(52) U.S. Cl.
CPC ........... *B65B 2210/08* (2013.01); *B67C 3/222* (2013.01); *Y02P 70/267* (2015.11)

(56) References Cited

U.S. PATENT DOCUMENTS

| | | |
|---|---|---|
| 2011/0031659 A1 | 2/2011 | Warner et al. |
| 2012/0266567 A1* | 10/2012 | Haesendonckx ....... B29C 49/12 53/456 |
| 2014/0157726 A1 | 6/2014 | Clusserath et al. |

* cited by examiner

FORM-FILLING MACHINE

CROSS-REFERENCE TO RELATED APPLICATION

The present application claims priority to European Application No. 14181646.2, filed Aug. 20, 2014. The priority application, EP14181646.2, is hereby incorporated by reference.

FIELD OF THE INVENTION

The invention relates to a form-filling machine and a process for molding and filling of plastic containers.

BACKGROUND OF THE INVENTION

As known, plastic containers can be produced out of preforms in a stretch-blowing process.

As an alternative to inflating the container with pressurized air, the EP 1529620 B1 describes a process for hydraulic reshaping of preforms into plastic bottles. For this purpose, the preforms are at first heated, inserted in a hollow mold and stretched there in a longitudinal direction. Further, mineral water or the like is added with overpressure in order to produce the final container shape. The mineral water remains in the container so that a subsequent separate bottling process can be omitted.

The US 2011/0031659 A1 further describes a process in which a heated preform is stretched by means of a stretching rod and then dilated hydraulically into a container by means of an incompressible fluid, especially water. Afterwards, the fluid is displaced by pressurized air and flows out of the container.

A form-filling machine according to the definition comprises at least one treatment station for expanding reshaping of plastic preforms into plastic containers in a hollow mold and for filling of a substantially liquid product or at least a liquid or solid component of the product into the plastic containers.

Liquids, also those that contain dissolved carbon dioxide or the like, are, by definition in accordance with their function during molding and filling of the containers, incompressible fluids in contrast to gases that are functionally defined as compressible fluids.

PURPOSE

Starting from the known state of the art, the invention is based on the purpose of creating conditions that are as low in oxygen as possible in a container filled in a form-filling machine.

SOLUTION

This problem is solved, according to the invention, by a process to create containers out of preforms according to claim 1 and the form-filling machine according to claim 7. Advantageous embodiments of the invention are included in the sub-claims.

The process according to the invention to produce containers out of preforms is characterized in that gas, which remains in the head space after the end of the filling process, is replaced by a particularly inert purge gas. This can prevent, for example, oxygen from remaining in the head space and thereby from potentially contaminating the product, e.g. especially beer, in the filled container.

In a variant of the invention, a lance with a nozzle is moved into the container during the molding and filling process, and moved to the head space for the addition of the purge gas. As the lance with the nozzle displaces volume, also the air volume in the container and hence also in the head space is already reduced in the process.

In particular, inert gas, preferably $CO_2$, is used as a purge gas. Therefore, undesired reactions of the purge gas with the product can be avoided and the shelf life can be improved.

In one variant, the process is characterized by the preform being stretched by a stretching rod that is moved into the preform during molding and that is moved out of the container after molding before the product is filled into the container.

In an upgrade of this variant, the purge gas is added through a stretching rod, preferably by a stretching rod that is completely or almost completely moved out of the container. Therefore, the stretching rod ensures both the stretching process as well as the addition of the purge gas.

In a variant, the preform is hermetically sealed by means of a sealing unit prior to molding and until after the addition of the purge gas. A potentially undesired air circulation above the product in the filled container and impurities of the product can thereby be prevented.

The form-filling machine according to the invention for the implementation of the process is characterized in that a blow-through device is to be installed to blow out remainders of gas of the head space of the container after filling by means of a purge gas. This device can in particular be used to displace remainders of oxygen in the head space whereby the shelf life of the product, e.g. of beer, can be increased.

In one variant, provision is made for a stretching rod in the form-filling station, which can stretch a container during molding, whereby the stretching rod can be moved into the preform and out of the container. Due to its intrinsic volume, the stretching rod reduces the gas volume that remains on top of the fluid level in the container.

If the stretching rod is pulled out, the volume in the head space, that can contain remainders of gas, will increase. Preferably, the stretching rod itself is used as a blow-through device, i.e. the stretching rod is equipped with a purge gas connection/channel.

An arrangement of the nozzle on the stretching rod can be provided for. This structure can be designed smaller than in cases where an additional lance and/or a separate nozzle is used.

In another variant, the form-filling machine is characterized in that a sealing unit is to be included, which can be positioned for airtight sealing around the aperture of the preform prior to molding, whereby the lance is arranged in the sealing unit. Circulations of air can thereby be avoided and possibly even undesired remainders of gases in the head space.

The purge gas can for example be branched off from a product channel. Also, it is possible to feed the purge gas into the machine from a compressor.

It would also be possible for the container to be reshaped and/or inflated at least partially by means of inert gas and/or $CO_2$ under pressure. In particular, the container will reach between 20% and 95%, preferably between 30% and 90%, of its later volume through the partial blow-molding process with the inert gas. The container particularly reaches between 30% and 100%, preferably between 50% and 100%, of its longitudinal extension (from the outlet to the bottom) during the partial blow-molding process. In particular, a stretching rod is inserted in the container during partial blow-molding of the latter, which leads to longitudinal stretching of the preform.

Especially, a plurality of treatment stations and/or forming and filling stations are to be installed, which are arranged particularly on the outer circumference of a continuously rotating rotary carousel. The rotary carousel is preferably a wheel.

In particular, the rotary carousel rotates around a vertical axis whose prolongation intersects with the grounding center.

All stations are arranged particularly in an equidistant spacing towards each other. The stations especially have cavities in which the containers are expanded against the inner walls of the cavity so that the readily molded containers will have the (negative) shape of the inner walls of the cavity.

In all examples described above, the form-filling machine can have a sealing unit that is designed to seal the filled plastic containers, for example by means of screw caps. In particular, sealing takes place within a period of time during which the container is still arranged in the mold and/or cavity in which it has been molded. Therefore, the sealing unit is located in the immediate vicinity of the rotary carousel, especially in its periphery, and dispenses the seal at a time as soon as all of the final product is in the container and a blowing and filling nozzle has been lifted off the container.

In particular, the production and/or expansion and the filling of the containers take place within a space with a low-contamination environment. The low-contamination environment, which is in particular a clear room, can be created by means of one or a combination of the following measures:

The low-contamination environment of the unit (within a machine protection) is set under overpressure in relation to the surrounding atmosphere by means of blowing filtered air through fine filters into the room, at least during the production process.

The drives for a variety of movements of the cavity are arranged outside of the clear room, i.e. for example the drives for opening and closing of the cavity (mold) and/or for the movement of a stretching rod and/or for lifting or lowering of a container and/or the movement of a blowing or filling nozzle.

The inner walls of the room are cleaned and/or sterilized in regular intervals, for example through spraying or steaming with caustic solution, acid, disinfection liquid, hydrogen peroxide (gaseous or liquid). In particular, the internal and external sides of the cavities, blowing and filling nozzles and the stretching rods are included in the cleaning and/sterilization process. Especially, the inner walls of the machine protection are also included.

The low-contamination environment is sealed against the surrounding atmosphere. In a rotary carousel, the sealing gasket can be a surge tank or a rubber seal, which seals the rotating part in relation to the fixed part of the device.

In particular, the containers and/or preforms are sterilized prior to insertion in the low-contamination environment, especially inside and outside.

In particular, the space has a substantially disc-shaped design. It can also have a ring or torus shape—in that case, the rotary axis is located outside of the low-contamination environment.

In particular, the containers prior to the expansion are plastic preforms that preferably have the shape of a test tube and/or that have one single aperture. Close to this aperture there is an outlet area, which is equipped for example with a thread for a seal that has already been shaped during the injection molding process. In addition, a support ring for the purpose of transportation and/or further processing of the preform/container can be provided for in the outlet area.

In the transportation direction of the containers upstream of the form-filling machine, there can be a heating unit that heats up the supplied cold preforms. An infrared furnace through which the preforms are transported can be used as a heating device. Especially infrared radiators are arranged at least on one side of a tunnel-shaped heating section through the furnace. Instead of the infrared furnace, there can also be a microwave heating device in which cavities for heating, that are especially aligned individually for each preform, can be provided for. While the microwave furnace is preferably a rotary carousel, the preforms are transported along a straight path for at least a part of the way in case of the infrared furnace.

Instead of the processes and devices for heating of cold (ambient temperature) preforms as just described, the preforms can also be created directly by an upstream injection-molding device and transported to the forming and filling device while being still heated. In energetic terms, this is beneficial as a part of the heat does not escape to the environment. However, an intermediate conditioning system might have to be provided for, which tempers the preforms only slightly (less than plus or minus 50° C.) and/or applies a temperature profile shortly before the preforms are transported to the form-filling machines. If the preforms are injection-molded within a clean room, they will possibly require no further sterilization if the clean room extends up to a position where a seal can be superimposed onto the container after filling.

In particular, the end product is a carbonated beverage.

As mentioned, also $CO_2$ can be used to inflate the container.

In particular, all devices (compressor, lines, tanks, rotary distributors, form-filling stations, blowing/filling nozzle) can be heated in the areas that the $CO_2$ comes in contact with.

It would also be possible to feed liquid $CO_2$ into the machine and to heat it within the machine shortly before feeding it into the preform in a way that it becomes gaseous.

Especially if a non-carbonated beverage should be bottled, another inert gas—especially nitrogen—can be used instead of the $CO_2$ for all processes and devices (except for carbonating) mentioned in this document. This comes in particular with the advantage of less oxygen being contained in the container.

If the $CO_2$ is led out of the machine through a rotary distributor, a separate track in the rotary distributor shall be provided for especially for this purpose.

Besides a product-transporting track, a $CO_2$-transporting track to feed $CO_2$ into the rotating part of the machine, another track can also be provided for in the rotary distributor to discharge $CO_2$. In particular, the discharged $CO_2$ is inputted between two compressor stages and/or used for carbonating the beverage and transported in lines to one or both of these installations.

For the addition of $CO_2$, valves that can be opened in a controllable way can be provided for. Through a valve, a tank or annular duct containing $CO_2$ can be connected to the container to be produced under the impact of a pre-blowing pressure. Through a second valve, an annular duct or tank exposed to a final blowing pressure can be connected to the container to be produced. In particular, the first valve is opened first, subsequently closed again and then the second valve is opened. While the second valve is still opened or immediately after closing the second valve, the first valve is opened once again in order to lead a part of the $CO_2$ back into the first tank. Afterwards, the other steps of use discussed above can take place in addition.

If a larger quantity than the $CO_2$ in the container, which will then only be impacted by the pre-blowing pressure, is needed to blow out the containers, the recycling into the tank under pre-blowing pressure can also be omitted.

In particular, more than 80% of the preform and/or container consist of PET.

In particular, the readily formed container has a petaloid base.

In a preferred process, the stretching rod for stretching of the preform is moved into the latter until a bottom of a blowing mold is reached. Then, the stretching rod is completely pulled out of the container in order to provide an as large as possible cross-section for a filling process. Subsequently, the stretching rod is inserted back in the head space of the container in order to mold it. Afterwards, the stretching rod is pulled back out of the container.

Instead of pulling the stretching rod completely out of the container for the filling process, it can also remain in the head space of the container and be used, for example, to transport the product (beverage) through a small screen installed on the stretching rod to the outer wall of the container.

For the inflation steps, especially a blowing nozzle (and/or filling nozzle) is used, which encloses the stretching rod in a ring-shaped way and which is positioned in the outlet area of the container, especially on the container or the mold in a sealing manner. Filling also occurs especially through the blowing nozzle.

DETAILED DESCRIPTION

Figure 1:
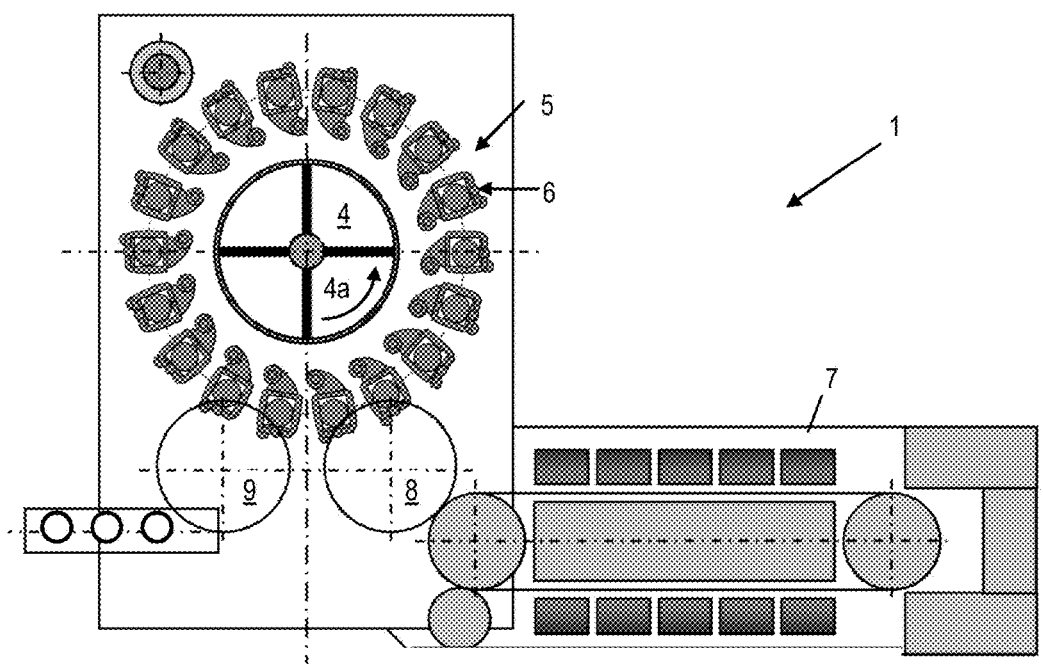
FIG. 1 shows a schematic display of a form-filling machine according to the invention.

FIG. 1 shows a schematic display of a form-filling machine 5 according to the invention in a form-filling unit 1. As shown in this document, it can be designed for example as a rotary carousel machine that has a plurality of form-filling stations 6 that are arranged on a carousel 4. The carousel can be rotatable around an axis along the indicated arrow direction 4a. The different form-filling stations can be inserted through appropriate input and output conveyors 8, 9 such as star wheels, preforms made of plastic materials such as PET.

From the transportation devices, they are transferred to the form-filling station 6. The form-filling stations usually comprise two mold halves in which the preform can be inserted. In the mold halves, the preform is then molded into a container. This can occur, for example, through stretching with a stretching rod and/or through addition of a medium under high pressure. For the molding of the container, also the product that is to be filled into the container can for example be used. Alternatively, molding can also be ensured completely or in part by means of injected air.

Regardless of whether molding occurs with product or not, filling of the molded container shall also occur in the form-filling machine, whereby the filling process can already start during molding or only after a completely finished molding process. This comes with the advantage that the container, which is still hot after molding, can be cooled faster.

Thereby, the condition that a fluidless area remains in the head space of a filled container, in which for example gas from the ambient such as air can be accumulated, is generally problematic. Besides the possibility of germ contamination, entrapped air is particularly detrimental also for beverages that are sensitive to oxygen, for example beer, as this can lead to a reduced product shelf life.

Therefore, the invention provides for the addition of a gas, especially an inert gas such as $CO_2$ in any physical state, into the head space after the end of the filling process so that remainders of gas in the head space, for example air, are displaced from the head space.

Figures 2, 2A:
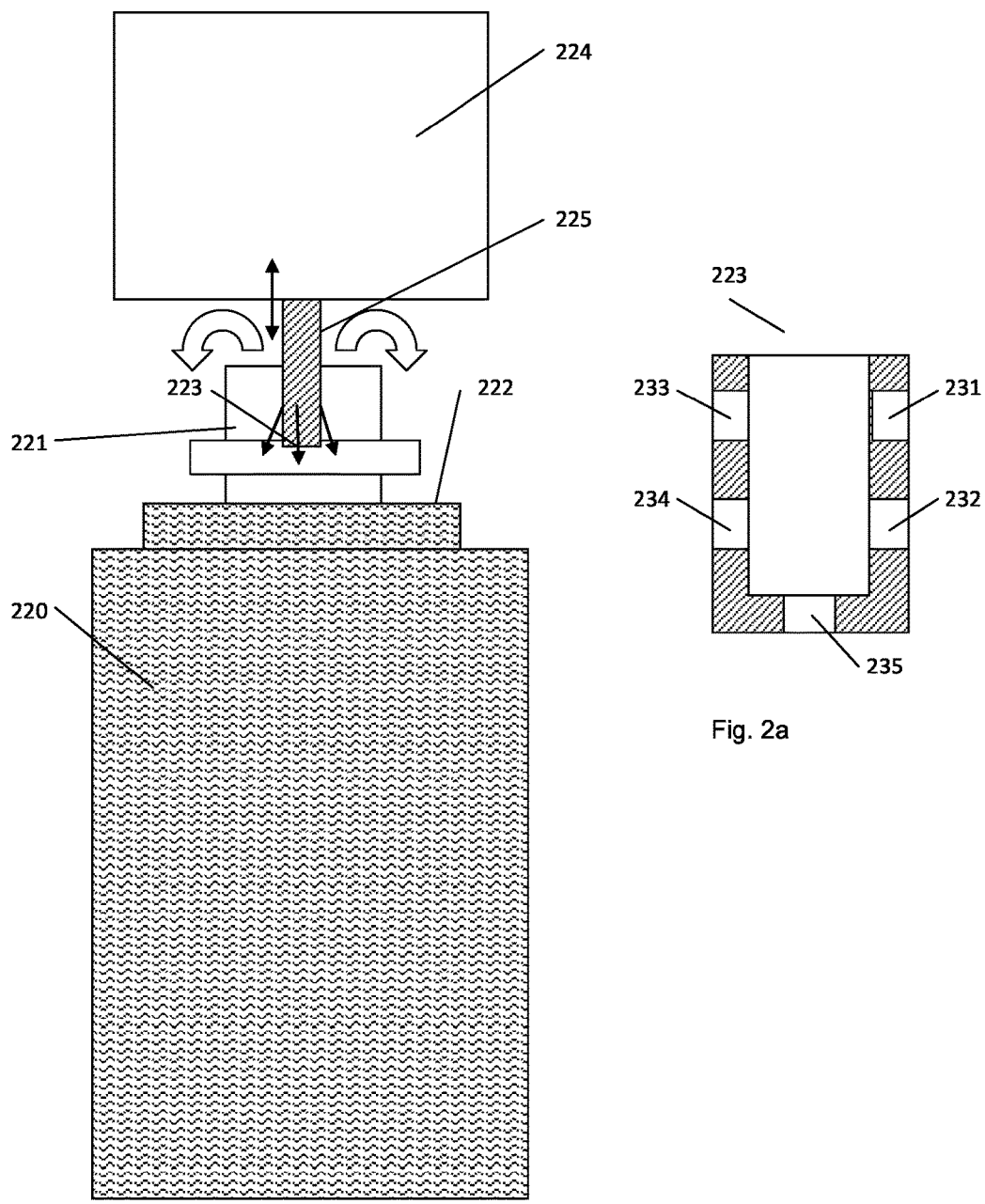
FIG. 2 shows a possible variant of a form-filling machine according to the invention, with a retractable lance, and a schematically-shown container.
FIG. 2a shows a nozzle used to introduce gas into the head space of the container illustrated schematically in FIG. 2

FIG. 2 shows a possible variant of the invention in which the container 220 is only schematically displayed in this document. It is still located in a type of a form-filling station 6, which is not shown here and which has been described for example in FIG. 1. The container is filled with liquid up to the filling level 222. There is no liquid in the head space 221 on top of it. After filling, however, there can be undesired remainders of air. To displace them, a gas is led into the head space by means of a nozzle 223. Therefore, the nozzle can be arranged for example on a lance 225 that can be moved into the head space of the filled container as far as it does not touch the fluid level. If the nozzle is positioned this way in the head space of the container, the purge gas such as $CO_2$ will be blown out of the nozzle in order to displace the remaining gas.

A more detailed view of a variant of the nozzle is illustrated on the right in FIG. 2. Hence, the nozzle can have for example an aperture 235 on the lower end and in addition further apertures 231-234 on the sides. The term "nozzle" shall thereby be understood as the entire arrangement of apertures on the lower end of the lance.

The lance 225 or the nozzle 223 can be fastened on a part of the form-filling station 224 in which for example also a stretching rod to stretch the preform into a molded container and/or a filling element or filling valve can be arranged. The aperture of the container 220 can be open towards the environment so that the remaining gas can flow out of the head space. As, however, the surrounding air can flow back into the head space if the lance 225 is pulled out of the head space 221 of the container once again, it can be necessary in this variant to also distribute purge gas out of the nozzle 223 in the head space or close to the head space while the lance is being pulled out 225 so that surrounding air coming from outside does not enter the head space.

Figure 3:
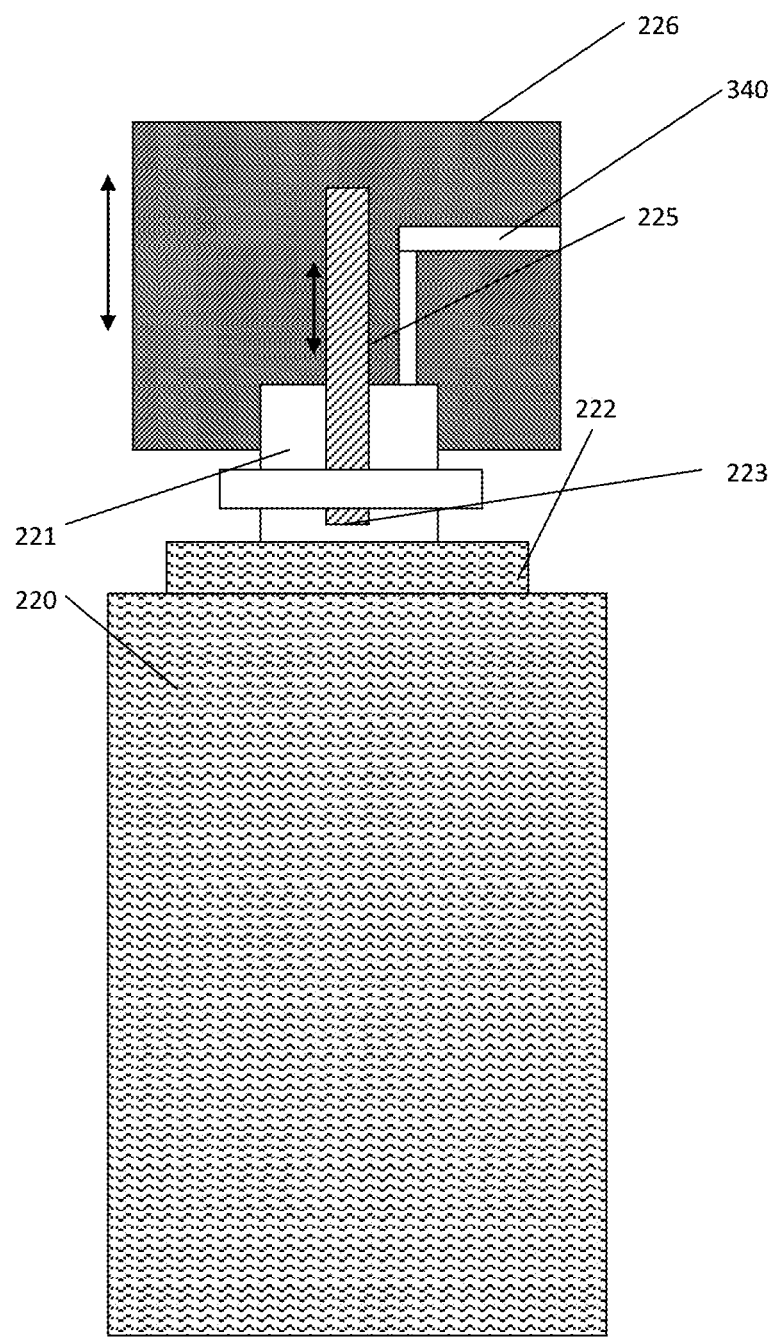
FIG. 3 shows another variant of the invention with a sealing unit.

Alternatively and according to the variant in FIG. 3, the head space of the container can also be isolated from the surrounding air. Therefore, a part 226 (sealing device) of the form-filling station can be moved around the aperture area of the container from above so that the aperture area is separated from the environment. This temporary sealing of the aperture of the container 220 is preferably done in a way as to separate the aperture in an airtight way from the environment. After this sealing process, purge gas is led into the head space 221 of the container through the nozzle 224 that can also be arranged on a lance 225 in this variant in order to displace the remaining gas from the head space 221.

To enable the remaining gas in the head space to flow out of the head space, either an additional exhaust unit and/or an additional exhaust aperture 340, through which the remaining gas can flow, shall be provided for in the sealing part 226, or the lance can have two line paths that are separated from each other whereby the purge gas is led through one line path and the gas that has remained in the head space 221 can flow out of the head space through the other line path. The line paths can be arranged concentrically to each other but also located next to each other.

In order to make the gas that has remained in the head space flow out in the best possible way, the lance may be designed to have only one nozzle 224 on the lower end but a plurality of apertures on the side areas, similar to the display in FIG. 2, so that the remaining gas can flow out through them.

Particularly advantageous is a system in which the lance 225 is not designed as an additional component but in which the stretching rod that is usually used to mold the container is equipped with an appropriate nozzle to add the purge gas. Then, the stretching rod can be moved out of the container, for example after molding the container and prior to feeding the product into the container, so that the product can be added smoothly, for example through a filling valve. Subsequently and either in accordance with the variant from FIG. 2 or the variant from FIG. 3, the stretching rod can be positioned above or in the head space of the filled container and feed purge gas into the head space through the respective nozzle 223. Thereby, at least a part of the molding process can be implemented with pressurized air and the purge gas can be led out of the same nozzles as the pressurized air. Therefore, the whole inner space can, in addition, be rinsed with purge gas also after molding and prior to the filling process.

Figure 4A:
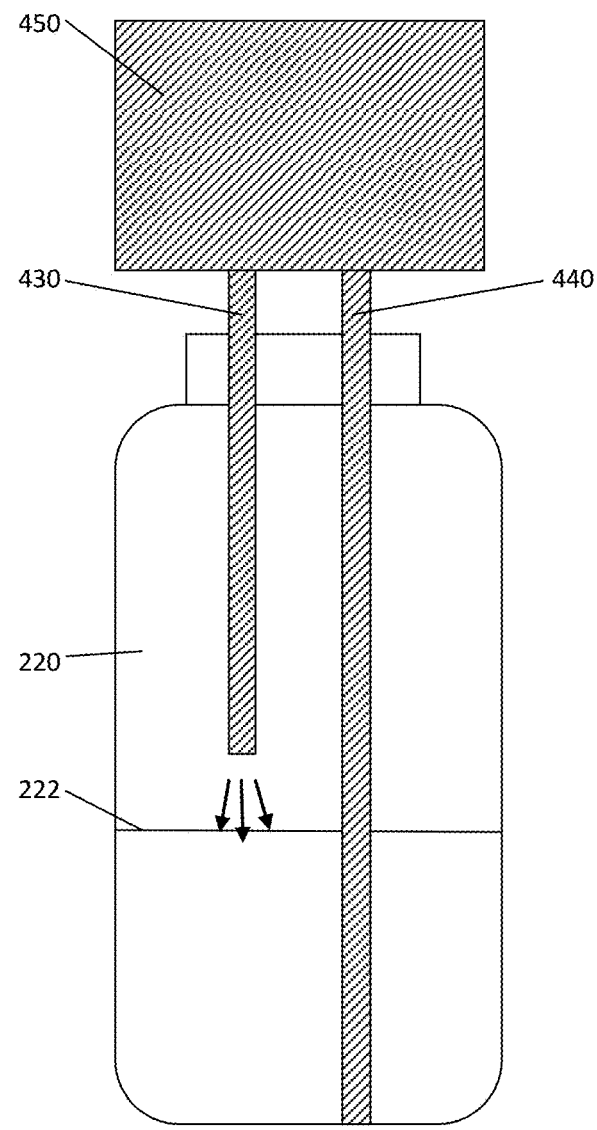
FIG. 4a shows a filling process in the molded container with a stretching rod moved into the container.
Figure 4B:
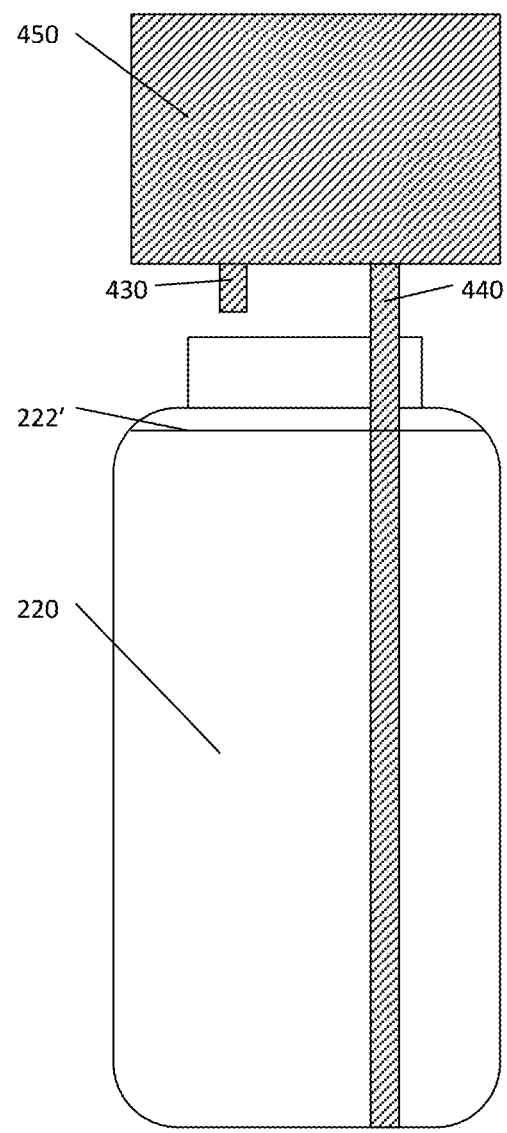
FIG. 4b shows the filling process after the filling is complete but prior to removal of a stretching rod.
Figure 4C:
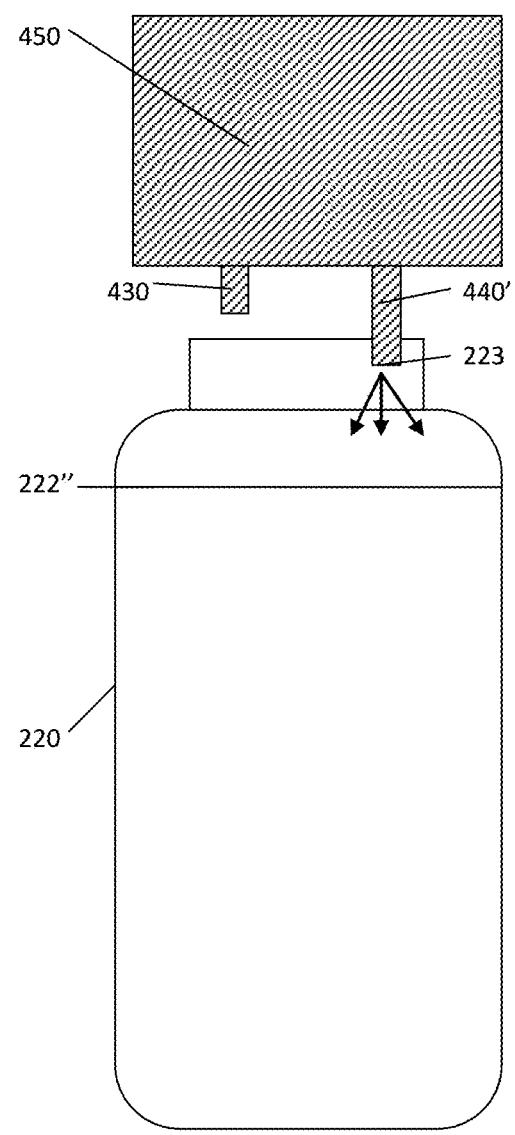
FIG. 4c shows the filling process after the filling is complete and after removal of a stretching rod, with purge gas introduced through a nozzle at an end of the stretching rod.

In another variant that is illustrated in the FIG. 4a-4c, the mobility of the stretching rod is used within the molded container to keep the volume in the head space of the container that has not been filled with liquid as low as possible for as long as possible before the purge gas is added.

For this purpose, FIG. 4a shows the filling process in the molded container 220 with a stretching rod 440 that is still moved into the container 220. The container in the situation shown in FIG. 4a is filled up to the filling level 222. Therefore, the container is filled with the product through a filling valve 430, which can also be arranged on a lance or which only extends as a valve out of a part 450 of the form-filling station. This process can either occur after complete molding of the container 220 or already start during the molding phase. The stretching rod that is moved into the container partially or completely thereby displaces volume that should actually be taken up by the filled product. This leads to the fluid level 222' of the product being higher after the end of the bottling process as shown in FIG. 4b than it should be the case after finishing the actual filling process. Through the higher fluid level, however, a lower quantity of gas remaining in the head space can be achieved.

After finishing the filling process and prior to pulling out the stretching rod, the volume in the head space that is not filled with liquid preferably amounts to $\frac{1}{10}$, preferably $\frac{1}{20}$, even more preferably $\frac{1}{50}$ of the volume of the head space that is not filled with liquid while the stretching rod is pulled out. To achieve these values, it might be necessary to remove the stretching rod at least partially from the container while the filling is still in process. This is especially the case when the volume of the stretching rod is so large that it exceeds the overall volume of the head space, in which there is no liquid, when the stretching rod is pulled completely out of the container. The insertion depth of the stretching rod can thereby be controlled in a simple way by changing the insertion depth of the stretching rod as a function of the filled quantity and the remaining volume.

After complete filling of the container in FIG. 4b, the stretching rod 440 is pulled out of the area of the container 220 that has been filled with liquid. Thereby, the fluid level 222' is reduced according to FIG. 4b to the fluid level 222", whereby the volume that becomes vacant in the head space is equivalent to the volume in the container up to the fluid level 222', which is displaced by the stretching rod in FIG. 4b. If the stretching rod is moved to the position 440' so that the nozzle 223 is located above the fluid level 222", the addition of the purge gas is started. As the stretching rod can be pulled out relatively fast and the addition of the purge gas can be started, the influx of ambient air can already be prevented at this point.

Particularly advantageous is a stretching rod that has apertures and/or valves on the outside of its longitudinal side to let out purge gas (similar to the apertures 231-234 according to FIG. 2) so that, as soon as the stretching rod is moved out of the position according to FIG. 4b, purge gas is spread in the head space that is not filled with liquid. It is particularly advantageous if the flow-out pressure of the lateral nozzles is at least slightly higher than the pressure of the surrounding atmosphere so that an overpressure develops to prevent the inflow of surrounding gas, especially air and oxygen. The subsequent addition of purge gas through the nozzle on the lower end of the stretching rod can then also displace the residual quantity of gas that has remained in the head space.

The variant according to FIG. 4a-4c can be applied both to the variant according to FIG. 2 as well as to the variant according to FIG. 3. If the variant of FIG. 4 is applied to the variant according to FIG. 3, it is particularly advantageous if the airtight sealing takes place already prior to filling, and especially even prior to molding of the container. If the airtight sealing takes place prior to molding of the container and if the preform is molded into a complete container through the addition of product, the quantity of gas that remains in the filled containers will be very low so that only a small quantity of purge gas is required for rinsing.

If the container is molded by means of a blowing nozzle with pressurized air or pressurized gas, a variant in which the blowing nozzle is used to add the purge gas and/or in which suction of the purge gas and/or the remaining gas in the container is ensured by the stretching rod or an additional lance can also be an option.

The gas used, such as especially $CO_2$, can usually be fed in from a separate tank, for example added to the individual form-filling stations by means of an annular duct in the form-filling machine. If the form-filling machine is used to fill containers with carbonated substances, $CO_2$ for the rinsing process can already be obtained here.

In another variant, the placement of a semi-permeable membrane onto the aperture of the filled containers after the filling process can also be provided for in order to seal the container in an airtight manner. This membrane can for example be pierced by a very thin lance with a diameter of 2, preferably 1, preferably less than 1 mm in order to add the purge gas. Due to the semi-permeability of the membrane, the remaining gas in the head space of the filled container can escape through the membrane while no gas, and especially no air from the environment, except for the purge gas added through the lance can flow into the head space on the other hand. If a low overpressure of the purge gas is created in the head space that is sealed by the membrane, it can be ensured even during removal of the lance that no surrounding gas can enter the head space through the hole in the membrane.

The invention claimed is:

1. A process to produce containers out of preforms, comprising:
 inserting the preform in a form-filling station;
 molding and filling the preform in the form-filling station with a liquid product, wherein the liquid product is a product that is to be filled into the container and the liquid product and a stretching rod are used during the molding of the preform; and
 replacing gas, which remains in a head space of the container after the end of the filling of the container, by a purge gas, wherein the purge gas is fed through a nozzle on a lower end of a stretching rod after the stretching rod is positioned above or in the head space of the filled container.

2. The process according to claim 1, further comprising moving a lance with the nozzle into the container during the molding and filling of the preform and into the head space to add the purge gas.

3. The process according to claim 1, wherein the purge gas is an inert gas.

4. The process according to claim 1, further comprising stretching the preform by the stretching rod that is inserted in the preform during the molding of the preform; moving the stretching rod out of the container after the molding the preform; and subsequently filling the liquid product into the container.

5. The process according to claim 4, wherein the purge gas is added while moving the stretching rod out of the container.

6. The process according to claim 1, further comprising sealing the preform in an airtight way by a sealing unit prior to the molding of the preform and until after the replacing of the gas by the purge gas.

7. The process according to claim 1, wherein the stretching rod is used to transport the liquid product.

* * * * *